United States Patent
Baumgarten et al.

(10) Patent No.: US 7,343,262 B2
(45) Date of Patent: Mar. 11, 2008

(54) SELF-PROPELLED HARVESTING MACHINE AND OPERATING METHOD THEREFOR

(75) Inventors: Joachim Baumgarten, Beelen (DE); Dirk Speckamp, Ahlen (DE); Willi Behnke, Steinhagen (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 0 days.

(21) Appl. No.: 11/527,210

(22) Filed: Sep. 26, 2006

(65) Prior Publication Data

US 2007/0089389 A1   Apr. 26, 2007

(30) Foreign Application Priority Data

Sep. 30, 2005   (DE) .................. 10 2005 047 335

(51) Int. Cl.
*G01D 1/00*   (2006.01)
*G06F 15/00*   (2006.01)
*G06M 11/04*   (2006.01)

(52) U.S. Cl. ........................ 702/129; 701/50
(58) Field of Classification Search ........ 702/129, 702/104, 156; 701/50; 700/28, 47, 50, 87, 700/100; 73/1.16, 861; 56/10.2 R, DIG. 15; 460/1, 4, 6, 7, 149
See application file for complete search history.

(56) References Cited

U.S. PATENT DOCUMENTS

| | | | | |
|---|---|---|---|---|
| 4,403,191 A | * | 9/1983 | Satake | 324/452 |
| 5,092,819 A | * | 3/1992 | Schroeder et al. | 460/7 |
| 5,173,079 A | * | 12/1992 | Gerrish | 460/7 |
| 5,327,708 A | * | 7/1994 | Gerrish | 56/1 |
| 5,351,558 A | * | 10/1994 | Horn et al. | 73/861.08 |
| 5,586,033 A | * | 12/1996 | Hall | 701/50 |
| 5,594,667 A | * | 1/1997 | Myers | 702/87 |
| 5,957,773 A | * | 9/1999 | Olmsted et al. | 460/7 |
| 6,167,337 A | * | 12/2000 | Haack et al. | 701/50 |
| 6,205,384 B1 | * | 3/2001 | Diekhans | 701/50 |
| 6,460,008 B1 | * | 10/2002 | Hardt | 702/156 |
| 6,553,300 B2 | * | 4/2003 | Ma et al. | 701/50 |
| 6,591,145 B1 | * | 7/2003 | Hoskinson et al. | 700/28 |
| 6,726,559 B2 | * | 4/2004 | Bischoff | 460/1 |
| 6,863,604 B2 | | 3/2005 | Behnke | |
| 2001/0002367 A1 | * | 5/2001 | Visagie | 460/4 |
| 2002/0133309 A1 | * | 9/2002 | Hardt | 702/129 |
| 2003/0014171 A1 | * | 1/2003 | Ma et al. | 701/50 |
| 2003/0216158 A1 | * | 11/2003 | Bischoff | 460/6 |

FOREIGN PATENT DOCUMENTS

DE   101 47 733   4/2003

* cited by examiner

*Primary Examiner*—Árpád Fábián Kovács
(74) *Attorney, Agent, or Firm*—Michael J. Striker (57) ABSTRACT

A method of operating a self-propelled harvesting machine includes continuously separating a crop-material flow into a useful-material flow and a remaining-material flow, in a separating step of the machine, capturing at least a portion of the useful-material flow from the separating step in a measurement channel, weighing the useful material contained in the measurement chamber and determining a density based on a weight that was measured, and optimizing operational patrameters of the separating step based on the weight that was determined.

20 Claims, 4 Drawing Sheets

SELF-PROPELLED HARVESTING MACHINE AND OPERATING METHOD THEREFOR

CROSS-REFERENCE TO A RELATED APPLICATION

The invention described and claimed hereinbelow is also described in German Patent Application DE 10 2005 047 filed on Sep. 30, 2005. This German Patent Application, whose subject matter is incorporated here by reference, provides the basis for a claim of priority of invention under 35 U.S.C. 119(a)-(d).

BACKGROUND OF THE INVENTION

The present invention relates to a method for operating a self-propelled harvesting machine such as a combine harvester and a harvesting machine designed for operating according to this method.

A combine harvester typically includes a threshing step, in which a flow of harvested stalks is separated into straw, which is discarded, and into a flow that contains the threshed-out grain and contaminants such as stalk pieces, non-threshed-out ear pieces, husks, etc., and a cleaning step, in which the contaminants are removed using sieves and a blower, in order to obtain a useful-material flow composed nearly exclusively of threshed-out grain.

Contaminants that remain in this useful material make it difficult to process the grain further, which is why the yields that can be attained for inadequately cleaned grain can be much lower than the yields of well-cleaned grain.

Although it is technically easy to adjust the large number of changeable operating parameters of the threshing and cleaning step such that a highly pure useful-material flow is attained, when a set of operating parameters is optimized without compromise and solely with regard for purity-related results, high losses of useful material result. This means that, the more that contaminants in the harvested grain are suppressed, the more the amount of grain increases that is removed as residual material and is therefore not utilized, or is at least not utilized in the most economical manner. An optimal yield can therefore be attained only when a reasonable compromise is found between purity and grain loss.

It is difficult even for an experienced user to pre-select the various operating parameters that result in a useful compromise of this type, because they depend on the type of material harvested and on the environmental conditions under which the crop material has grown, e.g., ground conditions, the climate during the growing period, the moisture content of the harvested material, etc. It is therefore desirable to be able to dynamically adapt the operating parameters of a harvesting machine to the properties of the crop material.

A method is made known in DE 10147733A1, with which a harvesting machine such as a combine harvester is operated with different settings of operating parameters in succession; the combine harvester is acted upon with a quantity of crop material that remains the same, working results are obtained for the various parameter settings, and the parameter setting at which the best working result was obtained is ultimately selected. The cleanliness of the grain is a criterium for evaluating the working result.

The publication calls for the operator to carry out a subjective evaluation of the cleanliness by assigning it a rating from "adequate" to "very good". In order to rate the cleanliness of the grain, the operator must be able to see the harvested material. This task can therefore not be carried out while the combine harvester is operating. The publication states that the cleanliness of the grain is linked to the density of the harvested grain, and that a grain density sensor can be located on a grain elevator, but it does not state how a grain density sensor of this type could be designed. It is difficult, in fact, to perform a reliable measurement of grain density of grain that moves constantly between the output of the cleaning step and the grain tank. Weighing flowing grain directly does not yield reproducible results; an indirect estimate of the density based, e.g., on optical detection, requires laborious calibration which would have to be carried out separately for every harvesting run, due to the above-mentioned environmental variables, which influence the optimum operating parameter values of the threshing and cleaning steps.

SUMMARY OF THE INVENTION

The object of the present invention is to create a method for operating a self-propelled harvesting machine that makes it possible to easily optimize the operating parameters of the harvesting machine during operation, so that useful material is obtained in a good yield and with good purity.

In keeping with these objects and with others which will become apparent hereinafter, one feature of the present invention resides, briefly stated, in a method of operating a self-propelled harvesting machine, comprising the steps of continuously separating a crop-material flow into a useful-material flow and a remaining-material flow, in a separating step of the machine; capturing at least a portion of the useful-material flow from the separating step in a measurement channel; weighing the useful material contained in the measurement chamber and determining a density based on a weight that was measured; and optimizing operational parameters of the separating step based on the weight that was determined.

Given that at least a portion of the useful-material flow out of the separating step is delayed in a measurement chamber, the non-reproducible influences are eliminated, which typically make it difficult to perform a density measurement of a moving flow of material.

In an initial approach, the fill level and weight of the useful material in the measurement chamber are determined, and this information is used to calculate the density. This approach is suited, in particular, for use with a large measurement chamber, which requires large quantities of material to be filled. By determining the fill level, a determination can be made regarding the density of the useful material even before the measurement chamber is filled completely.

If the harvesting machine is a combine harvester, the measurement chamber can be the grain tank itself of the combine harvester.

According to a second approach, to determine the density, the weight of the measurement chamber that has been filled to a specified level is measured. The weight determined in this manner is always directly proportional to the density, which means it is also possible to compare densities determined with different operating parameters when the volume of the specified level is not known exactly.

According to a preferred refinement of this second approach, at least a portion of the useful-material flow is fed continually to the measurement chamber, and a flow conveyed out of the measurement chamber is regulated in order to hold the filling of the measurement chamber to a specified level. A method of this type is practicable in particular with a combine harvester that continually transfers harvested grain to an accompanying vehicle and has only a small intermediate tank, which can be used as a measurement chamber.

According to a particularly simple embodiment, the specified level is the complete filling of the measurement chamber, and useful material fed to the measurement chamber after it is completely filled is directed away via an overflow.

To ensure that a measured density value is obtained that reflects the quality of the useful material this is being obtained currently, it must be ensured that the useful material in the measurement chamber is replaced continually. This is easily attainable when useful material flows continually out of the measurement chamber and is continually replaced by the incoming useful-material flow. In addition, the incoming useful-material flow should be stronger than the continually outflowing flow. This ensures that the measurement chamber is always full during non-stop operation, while excess useful material fed to the measurement chamber leaves via the overflow.

To obtain good purity of the useful material, the optimization of the operating parameters of the separating step preferably includes changing at least one operating parameter of the separating step in a direction that results in an increase in the density of the useful material that was separated out.

A change of this type is preferably carried out only when the density of the useful material obtained is below a reference density by more than a specified amount. When the density of the useful material is below the reference density by less than the specified amount, it can be assumed that a good purity of the useful material has been attained, and making any further changes to operating parameters with the goal of increasing density further would result in a disproportionately high increase in the losses of useful material.

It is therefore advantageous when the optimization also includes changing at least one operating parameter of the separating step in a direction toward reducing the remaining portion of useful material in the remaining-material flow. More specifically, in the case in which the harvesting machine is a combine harvester, this results in a reduction of grain losses, particularly when the density of the useful material deviates from the reference density by less than a specified amount.

A high degree of flexibility is attained when a direction of the change of the operating parameter that results in an increase in the density of the useful-material flow or a reduction in the remaining portion is determined via experimentation.

When the change of a first selected parameter of the separating step does not result in an expected increase in the density of the useful-material flow or a reduction in the remaining portion, a second parameter is advantageously selected and changed. By iterating the steps of determining density and changing the parameters, an optimal—or at least nearly optimal—parameter setting can be found over time.

The reference density used in a given iteration can be derived from a density measured in a previous iteration. As a result, the method becomes largely independent of fluctuations in the density of the useful material, which can occur from one harvesting run to another due to different crop qualities, moisture contents, etc.

As an alternative, the reference densities can be measured in advance with a specified fine setting of the separating step, i.e., at a setting that is known to deliver a highly pure useful-material flow, but also high losses of useful material.

Values of operating parameters set at the beginning of every harvesting run are preferably specified depending on the type of crop to be harvested.

The subject of the present invention is also a harvesting machine, with which a method of the type described above can be carried out.

The novel features of the which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
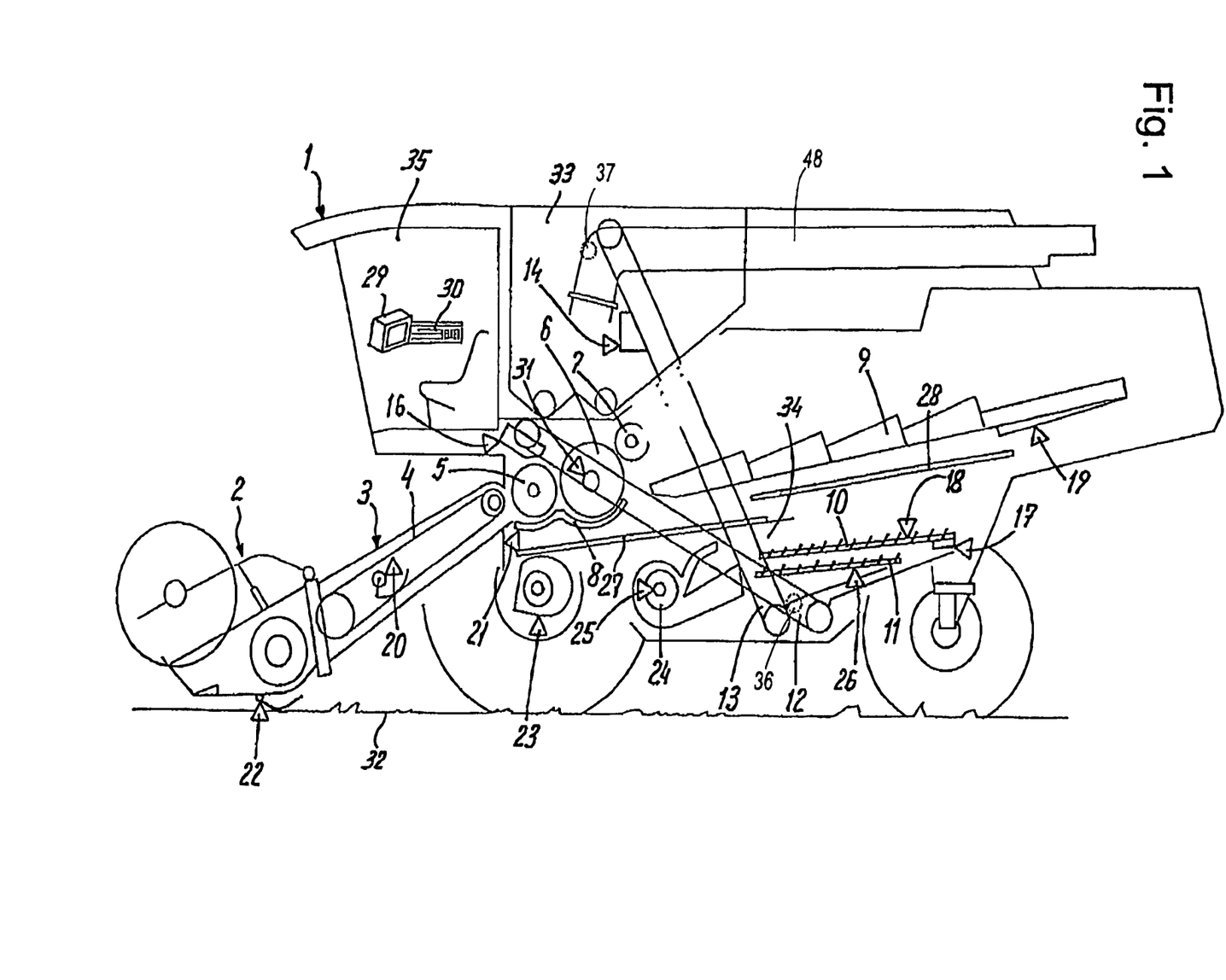
FIG. 1 shows an agricultural working machine in the form of a schematic side view of a combine harvester.

A schematicized side view of a combine harvester 1 is shown in FIG. 1. The object of a combine harvester 1 is to pick up the crop material growing on stalks from a field 32 and separate it from the straw and other admixtures. A grain cutting device 2, which is used to pick up the crop material, is shown in FIG. 1 as an example. It cuts the crop stalks with the crop material in the ears out of field 32 and combines them across the width of feeder 3. Located in feeder 3 are rotating feed chains 4 with transverse segments that feed the crop material to downstream threshing units 5, 6. The crop material is removed by preacceleration cylinder 5 at the end of feed rake 3 and is accelerated around the circumference of preacceleration cylinder 5 between preacceleration cylinder 5 and concave 8.

The accelerated crop material is then transferred to cylinder 6. The crop material is separated from the ears and straw via the striking and rubbing effect of preacceleration cylinder 5 and cylinder 6, and via the centrifugal force acting on the crop material. The crop material then travels through concave 8, which allows the crop material to pass, and reaches grain pan 27. The straw output by cylinder 6 is redirected by impeller 7 to several shakers 9 located next to each other across the working width. The oscillating motion of shakers 9 and their stepped design cause the straw to be conveyed to the back end of the combine harvester, and they cause the crop material remaining in the straw to be removed. This remaining quantity is also transferred via return pan 28 and an oscillation motion thereof to grain pan 27.

The crop material with the remaining admixtures, e.g., straw pieces, chaff and ear pieces, located on grain pan 27 is separated via an oscillating motion of grain pan 27 and its stepped design, and is conveyed to downstream cleaning units 10, 11, 24. The transfer takes place via a straw walker step 34 ventilated by cleaning fan 24 to upper sieve 10. Upper sieve 10 and lower sieve 11 located below it are usually chaffers with separately-adjustable opening widths; upper sieve 10 in the rear region can be adjusted with a opening width that differs from the remaining opening widths of upper sieve 10. A flow of air created by cleaning fan 24 passes through upper sieve 10 and lower sieve 11. The oscillating motion of sieves 10, 11 and the air flow cause the crop material and its admixtures to be directed toward the back end of the harvesting machine.

By way of straw walker step 34, large and lightweight admixtures are captured by the air flow before they reach upper sieve 10 and are ejected out of combine harvester 1. Smaller and heavier crop components travel from grain pan 27 via straw walker step 34 to upper sieve 10. Depending on the setting of the upper sieve width, the individual crop grains and further components of the crop material fall through it, thereby reaching lower sieve 11. Straw and non-threshed-out ears are moved past the front sieve area and, in the rear region of upper sieve 10, fall through upper sieve 10 directly into the "tailings". Lower sieve 11 typically has a finer plate structure than upper sieve 10, and is normally set with a smaller opening width than upper sieve 10. Larger and lighterweight crop components, such as crop grains with husks, ear parts or stalk parts—provided they have traveled through upper sieve 10 and reached lower sieve 11—are transferred via the oscillating motion and air flow into the tailings. The cleaned crop material itself falls directly through lower sieve 11 and is conveyed to grain tank 33 using a feed auger and grain elevator 13. The crop material that reaches the tailings is returned via a feed auger and tailings elevator 12 above preacceleration cylinder 5 to the threshing process.

Combine harvester 1 is equipped with a driver's cab 35, in which a control and monitoring device 29 and an operating and display device 30 are located. In addition, devices for specifying the driving direction and ground speed of combine harvester 1 are provided, although they are not shown and they are known to one skilled in the art. Control and monitoring device 29 and display and operating device 30 are connected with individual sensors and actuators located on combine harvester 1 at various points. They allow the operator of combine harvester 1 to adjust and monitor the operation of combine harvester 1. In FIG. 1, arrows point to the individual points in combine harvester 1 where a sensor is located for determining process and adjustment parameters. The particular actuators for adjusting combine harvester 1 are adequately known to one skilled in the art; the particular element will therefore not be depicted in FIG. 1. A cutting-height measuring device 22 is assigned to header 2. This device 22 serves to determine the actual distance between header 2 and field surface 32. The sensed value can be displayed to the operator using monitoring device 29 or display device 30, and can also be used as the actual value for the automatic regulation of cutting height. A crop-quantity measuring device 20 is installed in feed rake 3 to detect harvested quantity M. It determines the deflection of a feed chain 4, which depends on harvested quantity M. A further sensor system is located on concave 8. This concave-width measuring device 21 is provided singly or in plurality, and determines the distance between preacceleration cylinder 5 and concave 8 and/or cylinder 5 and concave 8 at one or more points. Preacceleration cylinder 5, cylinder 6 and impeller 7 are usually driven by a common drive, it being possible to vary the speeds of cylinders 5, 6, 7 using a servo drive. A cylinder-speed measuring device 31 for detecting at least one of the cylinder speeds is assigned to these cylinders 5, 6, 7. To produce different air flows through the cleaning device, the drive of cleaning fan 24 has a variable-speed design. The actual speed of cleaning fan 24 is detected using a cleaning-fan measuring device 25. Additional sensors can be assigned to the cleaning device. In this manner, the particular sieve opening width can also be detected using an upper-sieve width measuring device 18 and a lower-sieve width measuring device 26. These measuring devices 18, 26 can be part of the particular not-shown adjustment device, or they can be separate therefrom, and they can be located on sieve 10, 11. An upper-sieve loss measuring device 17 is located on the back end of upper sieve 10. This device is used to detect the portion of crop grains that leave combine harvester 1 via the cleaning device and that are considered losses. Sensors of this type are known to one skilled in the art and extend over part or all of the working width of the cleaning device. They are normally designed as a baffle plate or tube and evaluate the oscillations that are produced by the impact of crop grains on the plate or tube. This sensor technology can also be used and located at any other point in a combine harvester 1. This sensor technology allows flows of crop grains to be detected and makes it possible to obtain a determination—that is comparative and relative, at the least—of the quantities of grain present at a particular site. This sensor technology is also used in shakers 9 to detect the separation.

To obtain a determination of the amount of crop grains remaining in the straw, a shaker-loss sensor 19 is attached at least to the back end of a shaker 9. This sensor 19 detects the portion of crop grains separated at the end of shaker 9. To also evaluate the quantity of crop grains in the tailings, a baffle plate sensor system of this type can also be located at the end of lower sieve 11 or at the point at which the tailings are returned to the threshing process.

To evaluate the crop components located in the tailings, a tailings measuring device 16 is located on the upper end of tailing elevator 12. It is used to determine the tailings volume, the portion of grain, and the portion of damaged grain. Optical light barriers, optical sensors or transillumination sensors (NIR sensors) are known for use for this purpose. Grain elevator 13 is equipped with a yield measuring system 14.

Devices for measuring grain density can be located at different points on the combine harvester, e.g., at the points indicated by dotted circles 36, 37 in FIG. 1.

Figure 2:
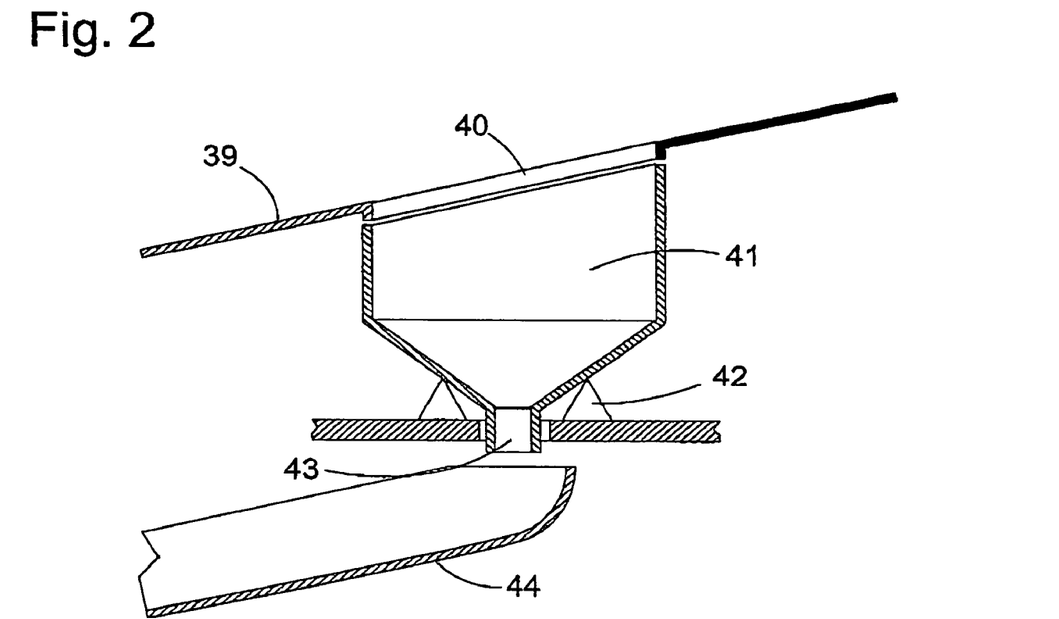
FIG. 2 shows a schematic sectional view through a grain-density measuring device according to a first embodiment of the present invention.

FIG. 2 shows a schematic cross section through a grain density measuring device, which can be located, e.g., at the point indicated by circle 36. An opening 40 is formed in a slanted plate 39 located beneath lower sieve 11, on which grain that has passed through lower sieve 11 slides to grain elevator 13. A bucket 41 is located beneath opening 40. Bucket 41 is held on a frame using force sensors 42, which deliver a measured signal representative of the weight of the contents of bucket 41 to a control and monitoring device 29. An outlet opening 43 is formed at the lowest point in the base of bucket 41, and under this is located a slide 44 that leads to grain elevator 13.

During operation, grain that slides on plate 39 fills bucket 41 to the rim. Grain that cannot fit into bucket 41 slides past it. Outlet opening 43 is dimensioned such that the quantity of grain flowing through it is less than that which flows past opening 40, thereby ensuring that bucket 41 is always full, but also ensuring that the contents of bucket 41 are continually replaced, so that the grain contained therein is representative of the quality of the grain currently being harvested. The grain practically comes to rest in bucket 41, so that it can settle, and the measured weight of bucket 41 truly allows the grain density to be reliably determined. The dwell time of the grain in bucket 41 is determined by the ratio between its volume and the cross-section of outlet opening 43; the dwell time can be, e.g., a few minutes.

Figure 3:
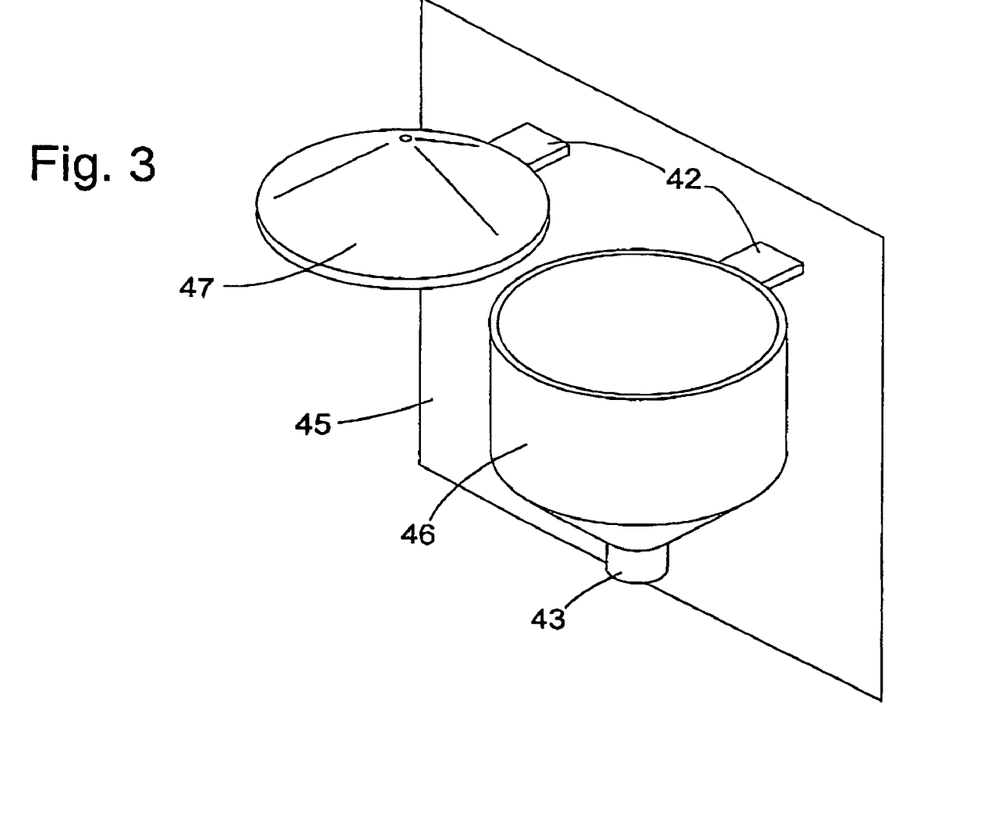
FIG. 3 shows a schematic, perspective view of a grain-density measuring device according to a second embodiment of the present invention.

A second configuration of a grain-density measuring device is shown in FIG. 3 in a perspective view; this configuration can be installed at points in the combine harvester where the grain falls freely, e.g., at the outlet of grain elevator 13. A bucket 46 and a cover 47 are mounted on a carrier wall 45 that is exposed to the flow of the falling grain. Bucket 46 and cover 47 are equipped with force sensors. The force sensors installed on bucket 46 detect the weight of bucket 46, and the force exerted by its contents and by grain falling onto it from above. The sensor on cover 47 detects its mass and the force of grain falling onto it. The cross-sectional surface of bucket 46 and cover 47 are the same, and the contour of cover 47 resembles a heaped cone that is formed by the grain in bucket 46 during operation.

As long as the density of the grain "rain" to which bucket 46 and cover 47 are exposed is the same, they both therefore detect the same force of falling grain, regardless of fluctuations in the density of the grain flow, shaking of the combine harvester, or the like. Similar to bucket 41 in FIG. 2, bucket 46 also includes an outlet opening 43, through which the grain can flow continually, so that the contents of bucket 46 are continually replaced. By determining the difference between the forces detected by bucket 46 and cover 47, control and monitoring device 29 evaluates the weight of grain in bucket 46 and, since the volume of the bucket contents can be assumed to be constant, it also evaluates its density.

According to a third, not-shown configuration, grain tank 33 itself is designed as a measurement chamber for determining the grain density by the fact that it is equipped with sensors for determining the weight of grain contained in the tank and the fill level of the tank. When the weight and fill level are known, control and monitoring device 29 is able to calculate the density of the grain in the tank.

According to a fourth configuration, the feed rate of a (not shown) elevator used to transfer grain from tank 33 using an arm 48 into an accompanying vehicle can be regulated as a function of the detected fill level of tank 33, in order to keep its fill level at a constant value. When the fill level of tank 33 is held constant in this manner during operation, the measured mass of the grain in tank 33 is a direct measure of its density.

Figure 4:
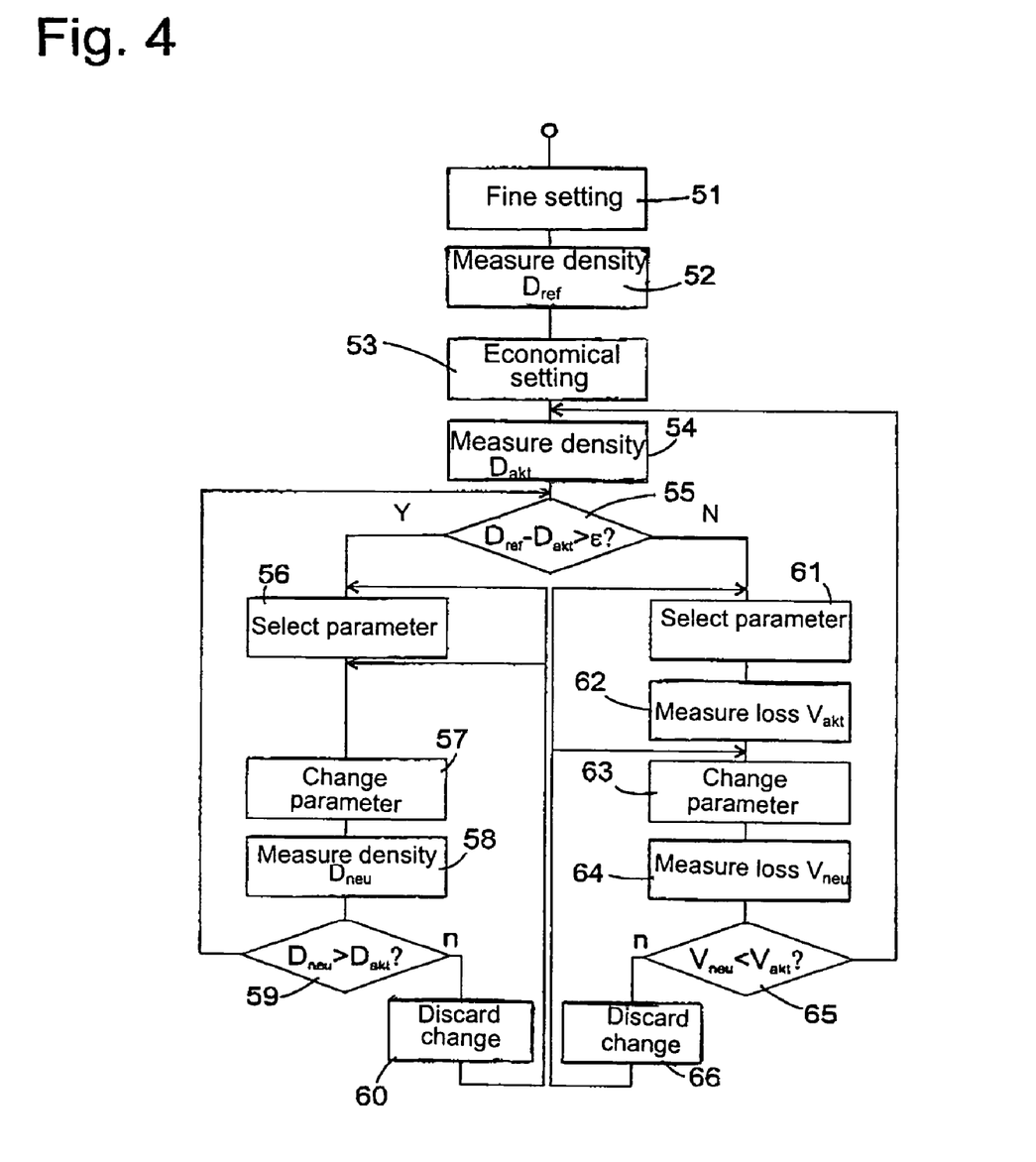
FIG. 4 shows a flow chart of a working procedure carried out by a control of the combine harvester.

FIG. 4 shows a flow chart of an operating procedure carried out by control and monitoring device 29.

Control and monitoring device 29 is designed to control the various above-mentioned operating parameters of the combine harvester that influence the grain purity and grain losses, e.g., the rotational speeds of cylinders 5, 6, 7 of the threshing mechanism, the gap width of concave 8, the width of upper sieve 10 and lower sieve 11, the speed of cleaning fan 24, etc. In a method step 51 at the beginning of a harvesting procedure, control and monitoring device 29 adjust the threshing mechanism and/or the cleaning step of the combine harvester to a "fine" setting in order to obtain grain that is, with certainty, free of contaminants. In the case of the threshing mechanism, for example, a fine setting of this type means the rotational speeds of cylinder 6 are high and the gap width of concave 8 is small.

A setting of this type delivers—at the outlet of the threshing mechanism—a material flow to be cleaned in which the grain is largely separated from husks and ear pieces adhering thereto, but which also contains an undesired, high portion of damaged grain. In the case of the cleaning step, the fine setting is characterized by a high speed of blower 24 and a small gap width of sieve 10, 11, and results in separation of components such as grain with husks, ear pieces and stalk sections that one wants to separate out anyway, but also in the separation of a large quantity of good grain, which reaches the tailings or is ejected. Higher grain losses resulting from the fine setting are tolerated temporarily. It is not necessary to retain this setting for a long period of time or to hold the crop-material flow fed to the threshing mechanism constant for a longer period of time; it suffices to obtain a quantity of grain that suffices to perform a density measurement in step 52. The density value obtained in this manner serves as a reference value $D_{ref}$ for use in subsequent operation.

Subsequently, an economical setting of the operating parameters of the combine harvester is implemented, i.e., parameter values are set that have been proven via experience to be suitable for the material to be harvested, and can be saved, e.g., as default settings in control and monitoring device 29 matched to the type of crop.

A measurement 54 of grain density $D_{akt}$ resulting from this economical setting is carried out.

Next, in step 55, a check is carried out to determine whether the difference $D_{ref}-D_{akt}$ between the two density values is above or below a specified tolerance threshold 8. When the difference is above it, an operating parameter is selected in step 56 that should be changed in order to obtain a higher density of the harvested grain. The selected operating parameter can be an operating parameter of the cleaning step or the threshing mechanism, because the setting of the threshing mechanism also influences the grain density via the quality of the threshing: "Soft" threshing delivers a high portion of grain with husks or ear pieces still attached which, if this material is not separated out, reduces the density of the harvested grain; "hard" threshing delivers a large quantity of small non-grain fragments, which also have a lesser density than the grain.

The extent of the change of the parameter selected in step 57 can be predetermined and fixed; it is also possible to select the change to be proportional to difference $D_{ref}-D_{akt}$, in order to quickly obtain a favorable value of the parameter. Another density measurement 58 is carried out, and results in density value $D_{neu}$. In step 59, it is evaluated whether $D_{neu}>D_{akt}$, that is, whether the parameter change has resulted in an increase in density. If it has not, the parameter change is discarded in step 60, and the direction of the parameter change is changed and the method returns to step 57, or, if this was already attempted and did not result in an improvement, the method returns to step 56, so that a new parameter can be selected. If it is determined in step 59, however, that the density increased, stored value $D_{akt}$ is replaced with $D_{neu}$, and the method returns to step 55.

The individual parameters are therefore optimized in order, until difference $D_{ref}-D_{akt}$ falls below $\epsilon$. If this is detected in step 55, it is assumed that an adequately good approximation of reference value $D_{ref}$ of the density has been attained, so that the harvested grain is adequately clean. Now, the grain losses can be optimized. To do this, a parameter to be changed is also selected, in step 61, from among the operating parameters of the combine harvester. Before this parameter is changed in step 63, current grain loss rate $V_{akt}$ is determined.

The extent of the parameter change in step 63 can be predetermined and fixed for the individual operating parameters. If difference $D_{ref}-D_{akt}$ is greater than a limiting value specified for each parameter, however, it is advantageous to specify the extent of the parameter change as a proportion of the difference, so that a small difference value can be attained in a few change steps.

After the change is carried out, the new grain loss rate $V_{neu}$ is determined (step 64), and the two loss rates are compared in step 65. A worsening of the loss rate results in the change being discarded (step 66), followed by the same parameter being changed in the opposite direction in step 63 or, if this has not already been successful, a new parameter to be changed is selected in step 61. If an improvement in the loss rate is attained in step 65, however, the method returns to step 54, in order to measure the current density and determine whether it is still located at the permitted distance s from reference value $D_{ref}$.

The method described forms an endless loop that results in the density of the grain fluctuating continually only slightly around $D_{ref}$-ε during non-stop operation. As an alternative, a comparison of difference $D_{ref}$-$D_{akt}$ with two tolerance thresholds ε1, ε2, with ε1<ε2, could be provided in step 55; the method would branch off to step 56 only if $D_{ref}$-$D_{akt}$>ε2, and to step 61 only if $D_{ref}$-$D_{akt}$<ε1. Otherwise, it would be assumed that the optimal setting has been found.

A modification of the working method is explained with reference to FIG. 5. In this case, first step 71 is to set a set of operating parameters known to be suitable for the crop to be processed, corresponding to step 53 in FIG. 4.

Resultant density $D_{ref}$ of the crop material is measured in 72; it is not necessarily optimal, but will not be too far from the optimium, so it can be assumed that it is possible to find the optimum by systematically varying the operating parameters in close proximity to the values that were set. An operating parameter to be varied is then selected (73) and changed (74). Resultant density $D_{neu}$ is measured in 75 and compared with $D_{ref}$ in 76. If difference $D_{neu}$-$D_{-ref}$ is greater than positive number ε, the change is retained, and $D_{ref}$ is overwritten with $D_{neu}$ in step 77, and the method returns to step 74. If the difference is negative, the change was carried out in the wrong direction; if it is positive or less than ε, it is considered to be not worthwhile and is discarded (78). Next, a decision is reached in 79 as to whether the parameter can be retained and the direction of its change can be changed, in which case the method returns to step 74. If the decision is whether a parameter has still not been varied, the method returns to step 73.

If neither of these cases applies, it can be provided that the method ends, or the method illustrated in FIG. 4 can be carried out from step 61 onward.

Figure 5:
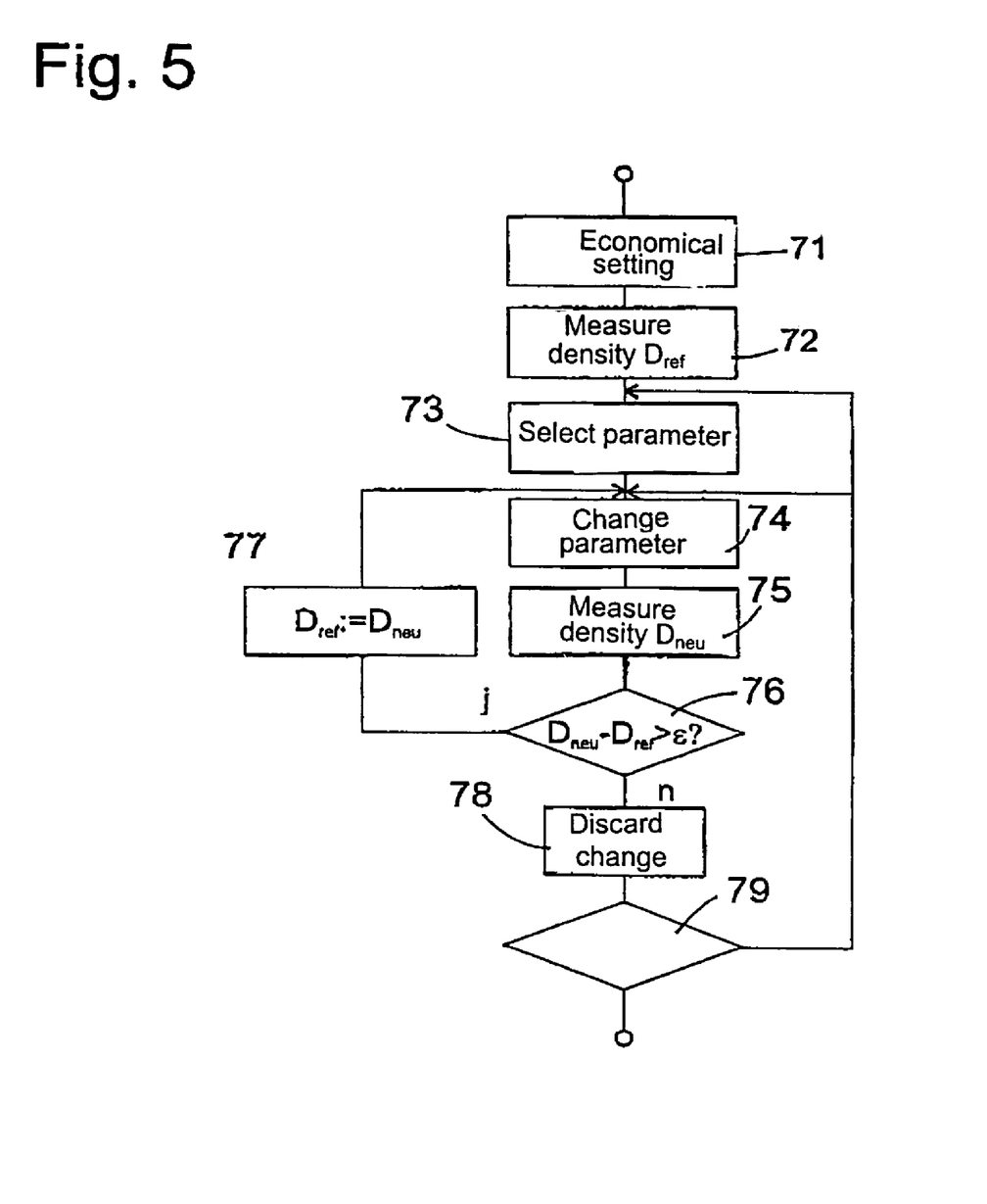
FIG. 5 shows a flow chart of a modified working procedure.

The method illustrated in FIG. 5 is based on the idea that a strict optimization of the density must result in a fine setting of the operating parameters with high grain losses. If, starting with a setting known to be useful, one attempts to optimize the density only to the extent that the density increases attainable using further optimization steps become small, an excessively fine setting is not attained, although it can be simultaneously assumed that the grain losses will be small, which cannot be assumed with an optimization based on a randomly selected initial setting. Steps 71 through 79 are therefore sufficient for attaining a good setting. It is possible, however, to optimize the grain losses separately using steps 61 ff.

It will be understood that each of the elements described above, or two or more together, may also find a useful application in other types of methods and constructions differing from the type described above.

While the invention has been illustrated and described as embodied in a self-propelled harvesting machine and operating method thereof, it is not intended to be limited to the details shown, since various modifications and structural changes may be made without departing in any way from the spirit of the present invention.

Without further analysis, the foregoing will so fully reveal the gist of the present invention that others can, be applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A method of operating a self-propelled harvesting machine, comprising the steps of continuously separating a crop-material flow into a useful-material flow and a remaining-material flow, in a separating step of the machine; capturing at least a portion of the useful-material flow from the separating step in a measurement channel; weighing the useful material contained in the measurement chamber and determining a density based on a weight that was measured; and optimizing operational parameters of the separating step based on the weight that was determined.

2. A method as defined in claim 1; and further comprising determining a fill level of the useful material in the measurement chamber, and based on this, calculating the density.

3. A method as defined in claim 1; and further comprising in the step of capturing at least a portion of the useful-material flow from the separating step in the measurement chamber, filling the measurement chamber to a specified level.

4. A method as defined in claim 1; and further comprising feeding at least a portion of the useful-material flow to the measurement chamber continuously; and regulating a flow conveyed out of the measurement chamber to hold a filling of the measurement chamber to a specified level.

5. A method as defined in claim 1; and further comprising using a combine harvester as the harvesting machine; and using a grain tank of the combine harvester as the measurement chamber.

6. A method as defined in claim 3; and further comprising using as the specified level a complete filling of the measurement chamber; and directing away the used material fed to the measurement chamber when it is full via an overflow.

7. A method as defined in claim 6; and further comprising flowing useful-material continuously out of the measuring chamber; and making the supplied useful-material flow stronger than an outflowing material flow.

8. A method as defined in claim 7; and further comprising including in the optimization, changing at least one operating parameter of the separating step in a direction that results in an increase in the density of the useful material that was separated out.

9. A method as defined in claim 8; and further comprising carrying out the changing of the operating parameter only when the density determined based on the weight that was measured is less than a reference density by more than a specified amount.

10. A method as defined in claim 1; and further comprising including in the optimization, changing at least one operating parameter of the separating step in a direction that results in a reduction of a remaining portion of the useful material in the remaining-material flow.

11. A method as defined in claim 1; and further comprising carrying out the changing of the operating parameter only when the density determined based on the weight deviates from the weight density by less than a specified amount.

12. A method as defined in claim 1; and further comprising determining experimentally a direction of a change of an operating parameter that results in an increase in the density of the useful-material flow or a reduction of a remaining portion.

13. A method as defined in claim 12; and further comprising carrying out the changing of at least one operating parameter so that when the changing of a first selected parameter of the separating step does not result in an expected increase in the density of the useful-material flow or in a reduction of a remaining portion, selecting and changing a second parameter is selected and changed.

14. A method as defined in claim 1; and further comprising iterating the steps including the weighing of the useful material and the optimization of the operating parameters.

15. A method as defined in claim 1; and further comprising deriving a reference density used in the optimizing the operating parameter of the separating step, of a given iteration, from a density measured by the weighing the useful material contained in the measurement chamber of a previous iteration.

16. A method as defined in claim 9; and further comprising selecting the specific amount proportional to a change in the parameter.

17. A method as defined in claim 11; and further comprising selecting the specific amount proportional to a change in the parameter.

18. A method as defined in claim 1; and further comprising using a reference density used in a step selected from the weighing the useful material and the optimizing the operating parameters, in advance with a fine setting.

19. A method as defined in claim 18; and further comprising specifying values of operating parameter adjusted initially, as a function of a type of crop to be harvested.

20. A self-propelled harvesting machine with separation of a crop-material flow into a useful-material flow and a remaining-material flow, the machine comprising a measurement chamber for capturing at least a portion of the useful-material flow; a sensor for detecting a mass of a useful material in said measurement chamber; and a control device configured for controlling the separation and for determining a density of the useful material contained in said measurement chamber and optimizing operating parameters of the separation based on the density that was determined.

* * * * *